United States Patent [19]

Kud et al.

[11] Patent Number: 4,846,994

[45] Date of Patent: Jul. 11, 1989

[54] USE OF GRAFT POLYMERS BASED ON POLYALKYLENE OXIDES AS GRAYNESS INHIBITORS IN THE WASH AND AFTERTREATMENT OF TEXTILE MATERIAL CONTAINING SYNTHETIC FIBERS

[75] Inventors: Alexander Kud, Eppelsheim; Wolfgang Trieselt, Ludwigshafen; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 175,175

[22] Filed: Mar. 31, 1988

[30] Foreign Application Priority Data

Apr. 3, 1987 [DE] Fed. Rep. of Germany ....... 3711319

[51] Int. Cl.$^4$ .......................... C11D 3/37; D06M 15/53
[52] U.S. Cl. ........................... 252/174.21; 252/174.23; 252/174.24; 252/DIG. 15; 8/137
[58] Field of Search ...................... 252/174.21, 174.23, 252/DIG. 15, 174.74

[56] References Cited

U.S. PATENT DOCUMENTS

| 4,444,561 | 4/1984 | Denzinger et al. | 8/137 |
| 4,647,396 | 3/1987 | Denzinger et al. | 252/174.24 |
| 4,746,456 | 5/1988 | Kud et al. | 252/174.24 |
| 4,814,102 | 3/1989 | Baur | 252/174.24 |

FOREIGN PATENT DOCUMENTS

| 285037 | 10/1988 | European Pat. Off. |
| 285038 | 10/1988 | European Pat. Off. |
| 286019 | 10/1988 | European Pat. Off. |
| 922457 | 4/1963 | United Kingdom |

*Primary Examiner*—A. Lionel Clingman
*Attorney, Agent, or Firm*—Joseph D. Michaels

[57] ABSTRACT

A detergent containing as grayness inhibitor in the wash and aftertreatment of textile material containing synthetic fibers graft polymers obtainable by grafting (a) polyalkylene oxides which have a number average molecular weight of from 300 to 100,000 and are based on ethylene oxide, propylene oxide and/or butylene oxide, with (b) at least one vinyl ester derived from a saturated monocarboxylic acid containing 3 to 6 carbon atoms, a methyl or ethyl ester of (meth)acrylic acid and optionally mixtures of at least one of the monomers mentioned and up to 95% by weight of vinyl acetate in a weight ratio (a):(b) of from 1:02 to 1:10.

7 Claims, No Drawings

USE OF GRAFT POLYMERS BASED ON POLYALKYLENE OXIDES AS GRAYNESS INHIBITORS IN THE WASH AND AFTERTREATMENT OF TEXTILE MATERIAL CONTAINING SYNTHETIC FIBERS

Legislation in many countries makes it necessary to substantially reduce the phosphate content in detergents or to supply phosphate-free detergents. If, however, the phosphate content in detergents is reduced, the washing action of the products suffers. Phosphates act not only as sequestrants for alkaline earth metal ions but also as incrustation and grayness inhibitors. While the problem of incrustation, ie. deposits of mineral origin on the wash, can be successfully dealt with by replacing the phosphates in detergents by other substances, this is not the case with the problems of graying, ie. the redposition of soil particles and greases on the wash during washing. The problem of graying occurs in particular in fabrics containing synthetic fibers, in particular in polyester containing textiles.

U.S. Pat. No. 4,444,561 discloses using copolymers which contain as characteristic monomers
  (a) from 50 to 90% by weight of at least one vinyl ester of a $C_1$- to $C_4$-aliphatic carboxylic acid,
  (b) from 5 to 35% by weight of at least one N-vinyl-lactam,
  (c) from 1 to 20% by weight of at least one monomer containing basic groups, or salts or quaternization products thereof, and
  (d) from 0 to 20% by weight of at least one other monomer free of carboxyl and basic groups and copolymerizable with monomers (a), (b) and (c), as copolymerized units,
as grayness inhibitors in the wash and aftertreatment of textile material containing synthetic fibers.

U.S. patent application Ser. No. 914,267 discloses using graft polymers obtainable by grafting
  (a) polyalkylene oxides of a molecular weight (by number average) from 2,000 to 100,000 based on ethylene oxide, propylene oxide and/or butylene oxide with
  (b) vinyl acetate in a weight ratio of (a):(b) from 1:0.2 to 1:10 and whose acetate groups may optionally have been hydrolyzed up to 15%,
as grayness inhibitors in the wash and aftertreatment of textile material containing synthetic fibers.

It is an object of the present invention to provide other grayness inhibitors for detergents and grayness inhibitors for aftertreating textile material containing synthetic fibers.

We have found that this object is achieved according to the invention by using as grayness inhibitors a graft polymer which is obtainable by grafting
  (a) a polyalkylene oxide having a number average molecular weight of from 300 to 100,000 and based on ethylene oxide, propylene oxide and/or butylene oxide, with
  (b) at least one ester selected from the group consisting of a vinyl ester derived from a saturated carboxylic acid having 3 to 6 carbon atoms, methyl acrylate, ethyl acrylate, methyl methacrylate and/or ethyl methacrylate, and mixtures of at least one of the said monomers with up to 95% by weight of vinyl acetate in a weight ratio (a):(b) of from 1:0.2 to 1:10 and whose ester groups may optionally have been hyrolyzed up to 15 mole %.

The products to be used according to the invention are known for example from GB Pat. No. 922,457. The graft bases used are the polyalkylene oxides specified above under (a), which have a number average molecular weight of 300 to 100,000 and are based on ethylene oxide, propylene oxide and/or butylene oxide. Preference is given to using homopolymers of ethylene oxide or ethylene oxide copolymers having an ethylene oxide content of from 40 to 99 mole %. Suitable comonomers for these copolymers are propylene oxide, n-butylene oxide and/or isobutylene oxide. Suitable are for example copolymers of ethylene oxide and propylene oxide, copolymers of ethylene oxide and butylene oxide, and also copolymers of ethylene oxide, propylene oxide and at least one butylene oxide. The ethylene oxide content of the copolymers is preferably from 40 to 99 mole %, the propylene oxide content from 1 to 60 mole % and the butylene oxide content in the copolymers from 1 to 30 mole %. Aside from straight-chain it is also possible to use branched homopolymers or copolymers as graft base. Branched copolymers are prepared by for example addition of ethylene oxide with or without propylene oxide and/or butylene oxides onto polyhydric low molecular weight alcohols, for example trimethylolpropane, pentoses of hexoses. The alkylene oxide unit can be randomly distributed in the polymer or be present therein as blocks. Preferably, component (a) comprises polyethylene oxides having a number average molecular weight of from 1,000 to 50,000.

Components (b) comprises vinyl esters derived from a saturated monocarboxylic acid containing 3 to 6 carbon atoms, and also methyl acrylate, ethyl acrylate, methyl methacrylate, ethyl methacrylate and mixtures of at least one of the abovementioned monomers with up to 95% by weight of vinyl acetate. Suitable vinyl esters which can be used as sole graft component are for example vinyl propionate, vinyl butyrate, vinyl valerate, vinyl i-valerate and vinyl caproate. Of the monomers of group (b), preference is given to using vinyl propionate, methyl acrylate or mixtures of vinyl propionate with up to 95% by weight of vinyl acetate.

To prepare the graft polymers, the polyalkylene oxides of component (a) which come into consideration are grafted with the monomers of component (b) in the presence of free radical initiators or by the action of high-energy radiation, which includes the action of high-energy electrons. This can be done by dissolving the polyalkylene oxide in at least one monomer of group (b), adding a polymerization initiator and polymerizing the mixture to completion. The graft copolymerization can also be carried out semicontinuously by first introducing a part, for example 10%, of the mixture of polyalkylene oxide to be polymerized, at least one monomer of group (b) and initiator, heating to polymerization temperature and, after the polymerization has started, adding the remainder of the mixture to be polymerized at a rate comensurate with the rate of polymerization. The graft copolymers can also be obtained by introducing polyalkylene oxides of group (a) into a reactor, heating to the polymerization temperature and adding at least one monomer of group (b) and polymerization initiator either all at once, a little at a time or preferably uninterruptedly and polymerizing.

Suitable polymerization initiators are in particular organic peroxides, such as diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide, diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide and also mixtures thereof, redox initiators and azo starters.

The graft polymerization takes place at from 50° to 200° C., preferably at from 70° to 140° C. It is customarily carried out under atmospheric pressure, but can also be carried out under reduced or superatomspheric pressure. If desired, the graft copolymerization described above can also be carried out in a solvent. Suitable solvents are for example alcohols, eg. methanol, ethanol, n-propanol, isopropanol, n-butanol, sec-butanol, tert-butanol, n-hexanol and cyclohexanol, and also glycols, such as ethylene glycol, propylene glycol and butylene glycol, and also the methyl or ethyl ethers of dihydric alcohols, diethylene glycol, triethylene glycol, glycerol and dioxane. The graft polymerization can also be carried out in water as solvent. In this case, the first step is to introduce a solution which, depending on the amount of added monomers of component (b) is more or less soluble in water. To transfer any water-insoluble products which form during the polymerization into solution, it is possible for example to add organic solvents, for example monohydric alcohols having 1 to 3 carbon atoms, acetone or dimethylformamide. However in the graft polymerization in water it is also possible to transfer the water-insoluble graft polymers into a finely divided dispersion by adding customary emulsifiers or protective colloids, for example polyvinyl alcohol. The emulsifiers used are for example ionic or nonionic surfactants whose HLB value is within the range from 3 to 13. For the definition of the HLB value reference is made to the paper by W. C. Griffin in J. Soc. Cosmet. Chem. 5 (1954), 249.

The amount of surfactant, based on the graft polymer, is from 0.1 to 5% by weight. If water is used as the solvent, solutions or dispersions of graft polymers are obtained. If solutions of graft polymers are prepared in an organic solvent or in mixtures of an organic solvent and water, the amount of organic solvent or solvent mixture used per 100 parts by weight of the graft copolymer is from 5 to 200, preferably from 10 to 100, parts by weight.

The weight ratios of components (a):(b) in the graft polymer is from 1:0.2 to 1:10, preferably 1:0.5 to 1:6. Such graft polymers have a K value of from 5 to 200, preferably from 5 to 70 (determined according to H. Fikentscher in 2% strength by weight solution in dimethylformamide at 25° C.). After the graft polymerization the graft polymer may be subjected to a hydrolysis where up to 15 mole % of the grafted-on monomers of component (b) may be hydrolyzed. For instance, the hydrolysis of graft polymers prepared using vinyl esters as component (b) gives graft polymers containing vinyl alcohol units. The hydrolysis can be carried out for example by adding a base, such as sodium hydroxide solution or potassium hydroxide solution, or alternatively by adding acids and if necessary heating the mixture.

The graft polymers described above are used according to the invention in detergents of reduced phosphate content (which is to be understood as meaning a phosphate content of less than 25% by weight of sodium triphosphate) or in phosphate-free detergents. For grayness inhibition in the wash, the graft polymers described above are added to commercially available detergent formulations in an amount of from 0.1 to 5, preferably from 0.3 to 3, % by weight, based on the detergent mixture. For addition to the detergent formulation the graft polymers can be in the form of a paste, of granules or of a highly viscous material, or as a dispersion or solution in a solvent. The graft polymers can also be adsorbed on the surface of additives, for example sodium sulfate, or builders (zeolites) and other solid assistants making up the detergent formulation.

Commercially available pulverulent detergents whose phosphate content is below 25% by weight and those which contan no phosphate at all contain as an essential constituent surfactants, for example $C_8$- to $C_{12}$-alkylphenol ethoxylates, $C_{12}$- to $C_{20}$-alkanol ethoxylates, and also block copolymers of ethylene oxide and propylene oxide. The polyalkylene oxides are solid substances at from room temperature to 50° C. and readily soluble or dispersible in water. They comprise in particular linear or branched reaction products of ethylene oxide with propylene oxide and/or isobutylene oxide which have a block structure or which can also have a random structure. The end groups of the polyalkylene oxides are capped or uncapped. The term capping as used herein is to be understood as meaning that the free OH groups of the polyalkylene oxides can be etherified and/or esterified and/or aminated and/or reacted with isocyanates.

Other suitable surfactants are anionic surfactants, such as $C_8$- to $C_{12}$-alkylbenzenesulfonates, $C_{12}$- to $C_{16}$-alkanesulfonates, $C_{12}$-to $C_{16}$-alkylsulfates, $C_{12}$- to $C_{16}$-alkylsulfosuccinates and sulfated ethoxylated $C_{12}$- to $C_{16}$-alkanols. Pulverulent detergents customarily contain from 5 to 20% by weight of a surfactant or a mixture of surfactants. The surfactant content in liquid deteregents is within the range from 15 to 50% by weight.

Pulverulent detergents may optionally also contain polycarboxylic acids or salts thereof, for example tartaric acid and citric acid.

A further important constituent of detergent formulations are incrustation inhibitors. These substances are for example homopolymers of acrylic acid, methacrylic acid and maleic acid and copolymers, for example copolymers of maleic acid and acrylic acid, copolymers of maleic acid and methacrylic acid and copolymers of (a) acrylic acid and/or methacrylic acid with (b) acrylic esters, methacrylic esters, vinyl esters, allyl esters, itaconic esters, itaconic acid, methylenemalonic acid, methylenemalonic esters, crotonic acid and crotonic esters. Also suitable are copolymers of olefins and $C_1$- to $C_4$-alkyl vinyl ethers. The molecular weight of the homopolymer or copolymer is from 1,000 to 100,000. The incrustation inhibitors are used in an amount of from 0.5 to 10% by weight in detergents.

Further possible constituents of detergents are corrosion inhibitors, monomeric, oligomeric and polymeric phosphonates, ether sulfonates based on unsaturated fatty alcohols, for example oleyl alcohol ethoxylate butyl ether and alkali metal salts thereof. Pulverulent detergents may also contain zeolites in an amount of from 5 to 30% by weight. The detergent formulations may also contain bleaching agents. If bleaching agents are used, they are customarily employed in amounts of from 3 to 25% by weight. A suitable bleaching agent is for example sodium perborate. The detergent formulations may also contain bleach activators, softeners, antifoams, scent, wash alkali (sodium carbonate), optical brighteners and enzymes. Additives, for example sodium sulfate, may be present in the detergents in an amount of from 10 to 30% by weight.

The graft polymers described above can also be used as additives in liquid detergents. Liquid detergents contain as admixture component liquid or even solid surfactants which are soluble or at least dispersible in the detergent formulation. Suitable surfactants for this purpose are those products which are also used in pulverulent detergents, and also liquid polyalkylene oxides or polyalkoxylated compounds. If the graft polymers are not directly miscible with the other constituents of the liquid detergent, a homogeneous mixture can be prepared by means of small amounts of solubilizers, for example water, or of a water-miscible organic solvent, for example isopropanol, methanol, ethanol, glycol, diethylene glycol or triethylene glycol.

The graft polymers are also suitable for use as additives in the aftertreatment of textile material containing synthetic fibers. For this purpose they are added to the final rinse bath of a washing machine cycle either together with a fabric conditioner customarily used at this juncture or, if a fabric conditioner is undesirable, alone in place of the fabric conditioner. The quantities used are from 0.01 to 0.3 g/l of wash liquor. The use of graft polymers in the final rinse bath of a washing machine cycle has the advantage that the wash in the next wash cycle is substantially less soiled by detached dirt particles present in the wash liquor than without the addition of the grayness inhibitor in the preceding wash.

In the Examples, the parts and percentages are by weight. The K values of the graft polymers were determined according to H. Fikentscher, Cellulosechemie, 13 (1932), 58-64, 71-74, in a polymer concentration of 2% strength by weight in dimethylformamide at 25° C.; K is here k.$10^3$. The Fikentscher K-value is an art recognized and accepted indication of relative molecular weights of polymers and is described in, "Vinyl and Related Polymers" by Schidlkneckt, John Wiley and Sons, New York 11, N.Y., 1952, at page 676. The number average moleculr weights of the polyalkylene oxides (a) used were calculated from the OH number.

The following products were used: graft polymers 1 to 16

The graft polymers were prepared using the process disclosed in GB Pat. No. 922,457 by grafting the monomers (b) indicated in Table 1 onto 100 parts of a polyalkylene oxide having the number average molecular weight likewise indicated in Table 1. The K values of the graft polymers are likewise given in Table 1.

TABLE 1

| Graft polymer | Monomer | Weight ratio PEO/monomer | Mn of PEO used | K-value |
|---|---|---|---|---|
| 1 | VPr | 1:0.5 | 300 | 9.1 |
| 2 | VPr | 1:2.0 | 300 | 12.4 |
| 3 | VPr | 1:2.0 | 9,000 | 32.3 |
| 4 | VPr | 1:1.72 | 35,000 | 57.9 |
| 5 | VPr | 1:2.3 | 35,000 | 53.8 |
| 6 | VPr | 1:3.44 | 35,000 | 56.0 |
| 7 | VPr | 1:4.0 | 35,000 | 40.5 |
| 8 | MA | 1:2.0 | 300 | 16.1 |
| 9* | VPr | 1:1.72 | 35,000 | 62.9 |
| 10 | VAc/VPr (8:2) | 1:2.0 | 6,000 | 28.5 |
| 11 | VAc/VPr (1:1) | 1:2.0 | 6,000 | 25.3 |
| 12 | VAc/VPr (7:3) | 1:2.0 | 9,000 | 39.0 |
| 13 | VAc/VPr (9:1) | 1:1.75 | 6,000 | 27.3 |
| 14 | VAc/VPr (9:1) | 1:1.75 | 9,000 | 40.9 |
| 15 | VAc/MA (8:2) | 1:2.0 | 9,000 | 39.8 |

TABLE 1-continued

| Graft polymer | Monomer | Weight ratio PEO/monomer | Mn of PEO used | K-value |
|---|---|---|---|---|
| 16 | VAc/MA (9:1) | 1:2.0 | 6,000 | 26.5 |

VPr = vinyl propionate
VAc = vinyl acetate
MA = methyl acrylate
PEO = polyethylene oxide
Mn = number average molecular weight
*corresponds to graft polymer 4 hydrolyzed to 15 mole %

The grayness-inhibiting action of the graft polymers indicated above was tested as follows: polyester test fabrics and polyester/cotton blend fabrics were subjected to a series of 3 washes together with a standard soil cloth. The soil cloth is renewed after every wash, the test fabric becoming more soiled in every wash. The whiteness of the test fabric after the third wash is used to assess the degree of soiling. Confidence in the results is increased by multiple replication and averaging. Photometric measurement of the reflectance in % was carried out in the present case at a wavelength of 460 nm (barium primary white standard as laid down in German Standard Specification DIN 5,033) on an Elrepho 2000 (Datacolor).

| Test conditions: | |
|---|---|
| Test equipment: | Launder-O-meter |
| Water hardness: | 3.5 mmol of Ca/l, Ca:Mg = 3:2 |
| Liquor quantity: | 250 ml |
| Liquor ratio: | 10:1 |
| Test temperature: | 35 to 60° C. |
| Test duration: | 30 minutes (with heating-up time) |
| Detergent concentration: | 8 g/l |

In the Examples, the grayness inhibitor was always used in an amount of 0.5%, based on the test detergent. The test vessels each contain 15 g of test fabric (5 g of polyester, 5 g of polyester/cotton blend and 5 g of cotton fabric) and 10 g of soil cloth. The soil cloth used was cotton soil cloth from the Krefeld laundry research station, specifically WFK 10D.

The test detergent used had the following composition:

| | |
|---|---|
| $C_{12}$-alkylbenzenesulfonate | 6.25% |
| Tallow fat alcohol reacted with 11 ethylene oxide | 4.7% |
| Soap | 2.8% |
| Na triphosphate (90% retention) | 20% |
| Na perborate (tetrahydrate) | 20% |
| $Na_2SO_4$ | 24% |
| Sodium disilicate | 6% |
| Mg silicate | 1.25% |
| Carboxymethylcellulose (CMC), Na salt | 0.6% |
| Tetrasodium salt of ethylenediamine-acetic acid | 0.2% |
| Remainder water ad | 100%. |

The test detergent is thus a phosphate-reduced detergent of the type commercially available since the second stage of the provisions of the West German Detergents Act concerning the maximum quantity of phosphate came into force in January 1984.

Table 2 shows the increase in the reflectance of polyester and polyester/cotton blend fabrics after addition of 0.5% of the products to be used according to the invention, based on the weight of test detergent used.

Table 2 also shows the results of comparative examples.

TABLE 2

| Example No. | Addition 0.5% based on test detergent | % reflectance PES | % reflectance PES/Co |
|---|---|---|---|
| 1 | Graft polymer 1 | 57.3 | 63.6 |
| 2 | Graft polymer 2 | 56.8 | 62.7 |
| 3 | Graft polymer 3 | 62.7 | 62.5 |
| 4 | Graft polymer 4 | 62.3 | 64.9 |
| 5 | Graft polymer 5 | 59.3 | 62.3 |
| 6 | Graft polymer 6 | 57.3 | 62.7 |
| 7 | Graft polymer 7 | 58.5 | 62.7 |
| 8 | Graft polymer 8 | 64.4 | 63.1 |
| 9 | Graft polymer 9 | 61.5 | 62.9 |
| 10 | Graft polymer 10 | 66.7 | 66.3 |
| 11 | Graft polymer 11 | 64.1 | 65.5 |
| 12 | Graft polymer 12 | 65.8 | 66.1 |
| 13 | Graft polymer 13 | 68.7 | 69.2 |
| 14 | Graft polymer 14 | 70.1 | 69.4 |
| 15 | Graft polymer 15 | 68.8 | 69.4 |
| 16 | Graft polymer 16 | 69.1 | 68.3 |
| Comparative Examples | | | |
| 1 | — | 44.8 | 61.2 |
| 2 | VAc/VP/DEAEA copolymer [1] as per Ex. 8 of U.S. Pat. 3,333,561 | 55.3 | 61.7 |
| 3 | PEO (Mn = 300) | 42.0 | 56.1 |
| 4 | PEO (Mn = 9,000) | 42.5 | 58.6 |
| 5 | PEO (Mn = 35,000) | 43.9 | 59.9 |
| 6 | Dispersed polyvinyl propionate (K value: 51.7) | 41.8 | 55.6 |
| 7 | Dispersed polymethyl acrylate (K value: 62.3) | 42.5 | 58.8 |
| 8 | Dispersed polyvinyl acetate (K value: 42.0) | 44.2 | 50.3 |

VP = vinyl pyrrolidone
DEAEA = dimethylaminoethyl acrylate
VAc = vinyl acetate
Mn = number average molecular weight As Table 2 reveals, the graft copolymers to be used according to the invention have a better action as grayness inhibitors than the copolymer give in Example 8 of U.S. Pat. No. 4,444,561. The Comparative Examples clearly show that neither dispersed polyvinyl propionate, nor dispersed polyvinyl acetate, nor dispersed polymethyl methacrylate nor, alternatively, polyethylene oxide alone have any grayness-inhibiting action.

We claim:

1. A detergent comprising surfactants, builders and, if desired, conventional additives, which contains, as an added soil antiredeposition agent, from 0.1 to 5% by weight of a graft polymer which is obtainable by grafting
   (a) a polyalkylene oxide having a number average molecular weight of from 300 to 100,000 and based on ethylene oxide, propylene oxide and/or butylene oxide, with
   (b) at least one ester selected from the group consisting of a vinyl ester derived from a saturated carboxylic acid having 3 to 6 carbon atoms, methyl acrylate, ethyl acrylate, methyl methacrylate, ethyl methacrylate and mixtures of at least one of the said monomers with up to 95% by weight of vinyl acetate in a weight ratio (a):(b) of from 1:0.2 to 1:10.

2. A detergent as claimed in claim 1, wherein the graft polymer added as a soil antiredeposition agent is obtainable by grafting
   (a) polyalkylene oxide having a number average molecular weight of from 1,000 to 50,000, a polymerized ethylene oxide content of from 40 to 100 mole % with
   (b) at least one ester selected from the group consisting of vinyl propionate, methyl acrylate and mixtures of vinyl propionate with up to 95% by weight of vinyl acetate in a weight ratio (a):(b) of from 1:0.5 to 1:6.

3. A detergent as claimed in claim 1, wherein the graft polymer added as a soil antiredeposition agent has a K value of from 5 to 200, determined according to H. Fikentscher in 2% strength by weight solution in dimethylformamide at 25° C.

4. A detergent as claimed in claim 1, wherein the graft polymer added as a soil antiredeposition agent is obtainable by grafting
   (a) polyethylene oxide having a number average molecular weight of from 1,000 to 50,000 with
   (b) vinyl propionate in a weight ratio (a):(b) of from 1:0.5 to 1:6 and has a K value of from 5 to 200, determined according to H. Fikentscher in 2% strength by weight solution in dimethylformamide at 25° C.

5. A detergent as claimed in claim 1, wherein up to 15% of the ester groups of the graft polymer are hydrolyzed.

6. A detergent comprising as an added soil antiredeposition agent, from 0.1 to 5% by weight of a graft polymer having a K value of from 5 to 200 (determined according to H. Fikentscher in 2% strenght by weight solution in dimethylformamide at 25° C.) and which is obtainable by grafting
   (a) a polyalkylene oxide having a number average molecular weight of from 300 to 100,000 and based on ethylene oxide, propylene oxide and/or butylene oxide, with
   (b) at least one ester selected from the group consisting of a vinyl ester derived from a saturated carboxylic acid having 3 to 6 carbon atoms, methyl acrylate, ethyl acrylate, methyl methacrylate, ethyl methacrylate and mixtures of at least one of the said monomers with up to 95% by weight of vinyl acetate in a weight ratio (a):(b) of from 1:0.2 to 1:10.

7. A process for soil antiredeposition during washing with detergents having a reduced phosphate content of less than 25% by weight of sodium triphosphate, which comprises using as a soil antiredeposition agent a graft copolymer having a K value of from 5 to 200 (determined according to H. Fikkentscher in 2% strength by weight solution in dimethylformamide at 25° C.) and which is obtainable by grafting
   (a) a polyalkylene oxide having a number average molecular weight of from 300 to 100,000 and based on ethylene oxide, propylene oxide and/or butylene oxide with
   (b) at least one ester selected from the group consisting of a vinyl ester derived from a saturated carboxylic acid having 3 to 6 carbon atoms, methyl acrylate, ethyl acrylate, methyl methacrylate, ethyl methacrylate and mixtures of at least one of the said monomers with up to 95% by weight of vinyl acetate in a weight ratio (a):(b) of from 1:0.2 to 1:10.

* * * * *